United States Patent
Buethker et al.

(10) Patent No.: US 7,772,810 B2
(45) Date of Patent: Aug. 10, 2010

(54) DC-DC CONVERTER WITH ADAPTIVE SWITCHING PARAMETER ADJUSTMENT

(75) Inventors: Henricus C. J. Buethker, Mierlo (NL); Lambert J. H. Folmer, Overasselt (NL); Cornelis Stienstra, Roden (NL)

(73) Assignee: ST-Ericsson SA, Geneva (CH)

( * ) Notice: Subject to any disclaimer, the term of this patent is extended or adjusted under 35 U.S.C. 154(b) by 303 days.

(21) Appl. No.: 11/573,353

(22) PCT Filed: Aug. 4, 2005

(86) PCT No.: PCT/IB2005/052606

§ 371 (c)(1), (2), (4) Date: Dec. 7, 2007

(87) PCT Pub. No.: WO2006/018772

PCT Pub. Date: Feb. 23, 2006

(65) Prior Publication Data

US 2008/0169796 A1     Jul. 17, 2008

(30) Foreign Application Priority Data

Aug. 13, 2004   (EP)   .................. 04103909

(51) Int. Cl.
*G05F 3/16*      (2006.01)
*G05F 1/00*      (2006.01)

(52) U.S. Cl. ...................... 323/224; 323/283

(58) Field of Classification Search ................. 323/283, 323/224

See application file for complete search history.

(56) References Cited

U.S. PATENT DOCUMENTS

| | | | |
|---|---|---|---|
| 5,568,044 A | 10/1996 | Bittner et al. | |
| 6,177,787 B1 | 1/2001 | Hobrecht | |
| 6,977,492 B2 * | 12/2005 | Sutardja et al. | 323/283 |
| 7,009,372 B2 * | 3/2006 | Sutardja et al. | 323/283 |
| 7,208,897 B2 * | 4/2007 | Hotto et al. | 318/466 |
| 7,504,815 B2 * | 3/2009 | Moyse et al. | 323/351 |
| 7,589,506 B2 * | 9/2009 | Brown | 323/271 |
| 2004/0047166 A1 | 3/2004 | Lopez-Santillana | |
| 2004/0141341 A1 | 7/2004 | Higashitani et al. | |

FOREIGN PATENT DOCUMENTS

WO   WO2004064237 A   7/2004

\* cited by examiner

*Primary Examiner*—Shawn Riley (57) ABSTRACT

A fully digital DC/DC automatic up/down converter circuit converts an input voltage to an output voltage of a predetermined value based on a switching operation. The switching operation includes switching operation comprise-cycles having at least one switching operation phase. The converter is controlled by a digital controller having a look-up table in which a plurality of data is stored. The digital controller uses certain data from the plurality of data with respect to an actual switched operating mode for continuously adjusting the begin and the end of a switching operation. The switched operating modes are a PWM and a PFM mode.

18 Claims, 6 Drawing Sheets

DC-DC CONVERTER WITH ADAPTIVE SWITCHING PARAMETER ADJUSTMENT

The present invention relates to a converter circuit for converting an input voltage to an output voltage of a predetermined value, and to a corresponding conversion method.

Regulated or controlled power supplies are found in virtually all electronic devices, including battery chargers, cellular telephones, computers, computer monitors, televisions, audio equipment and video cameras. A typical component of a power supply can be a converter, such as a direct current to direct current converter (in the following simply designated as DC-DC converter), which operates from a power source, generates an alternating signal as an intermediate process and delivers an output signal to a load.

Basically, such a DC-DC converter accepts a DC input voltage (Vin) and produces a DC output voltage (Vout). Typically, the output voltage produced is at a different value or level than the input voltage. With respect to the relation between the input voltage and the output voltage of a DC-DC converter there are principally two operating modes. A first mode is an up-mode, where Vin is smaller than Vout. Second mode is a down-mode, where Vout is smaller than Vin. Modern DC-DC converters for use in portable equipment, like mobile phones, PDAs, portable CD-players etc., are used to adapt the battery voltage to the needs of the various circuits in the system. Nowadays, the number of electronic devices with a battery power source is increasing. Here, the input voltage is in the range of battery voltages, which means that a simple down-only or up-only converter is not adequate. The battery voltage of a Li-Ion battery, for instance, can vary between 2.7 V and 4.2 V. When the required voltage lies in the middle of this range, e.g. 3.3 V, an up- and a down-converter is needed.

In principle, a converter circuit generates a regulated output voltage Vout of a certain value from a variable input voltage Vin. As mentioned above, the input voltage Vin and the output load may change during time of use. Such DC voltage converters usually use certain electrical components, e.g. an inductor L, to store electrical energy generated by a current flowing through the inductor L. Further, depending of the circuit arrangement there is at least one switching device, which may be a power transistor or another controllable semiconductor switching device. The switching device is used to alter a respective current path, so that the energy stored in the inductor L is than transmitted as a current to the output, where it charges a capacitor C connected in parallel to the output terminal, such that the output voltage is substantially kept constant. By continuously switching on and off the switching device, the energy continuously stored in the inductor L is continuously transferred to the capacitor C and charges the capacitor C. Further, there may be a diode D for decoupling between the voltage at the capacitor C and the voltage at the switching device, so that the output voltage Vout can be higher than the input voltage Vin. There are two basic switched operating modes, in which a DC converter can be operated.

As a first alternative, a converter circuit can be operated in a pulse width modulation (PWM) operation mode. In principle, a control signal, e.g. having a waveform of square wave, is provided to the control terminal of a switching device to control its on- and off-states. Thus increasing the on-time of the switching device increases the output voltage and vice versa. Therefore, modulating the duty cycle of the square wave may regulate the output voltage. In most of the known converter circuits, an analog control circuit in a control loop, which continuously compares the output voltage to a predetermined reference voltage and adjusts the duty cycle of the control signal to maintain the output voltage substantially constant, accomplishes this modulation.

As a second alternative, the switching device may be operated in a pulse frequency modulation (PFM) operation mode, wherein the switching frequency is changed in order to substantially keep constant the output voltage Vout. In principle, an oscillator and a driver circuit, which generates a corresponding control signal, e.g. a rectangular signal, supplied to the control terminal of the switching device, can control the switched operating mode. PFM operation mode of the DC converter provides better efficiency at small output current levels that does the above PWM operation mode. Firstly, a PFM operation mode requires less turn-on transitions to maintain a constant output voltage than does a PWM operation mode, thus resulting in a lower gate-drive power dissipation of the switching transistor. Secondly, since the PFM operation mode can be achieved with a much simpler control circuit having fewer components, the power dissipation in a control loop of the PFM operation mode is less than that of the control loop of the PWM operation mode. However, when the output current reaches a moderate level and higher, the PFM operation mode of voltage regulation becomes impractical, since the maximum output current available from the PFM operation mode is generally much less than that available from the PWM operation mode.

A known type of a converter circuit is the switching voltage regulator described in U.S. Pat. No. 5,568,044. That voltage regulator achieves high efficiency by automatically switching between a PFM operation mode and a PWM operation mode. Switching between the modes of voltage regulation is accomplished by monitoring the output voltage and the output current, wherein the regulator operates in PFM mode at small output currents and in PWM mode at moderate to large output currents. PFM mode maintains a constant output voltage by forcing the switching device to skip cycles when the output voltage exceeds its nominal value. In PWM mode, a PWM signal having a variable duty cycle controls the switching device. A constant output voltage is maintained by feedback circuitry that alters the duty cycle of the PWM signal according to fluctuations in the output voltage.

The known DC-DC converter has several drawbacks. One important aspect is slope compensation, which can be applied by a converter using current mode control when in PWM mode. Current mode control means, that an active switch is turned off when a programmed current is reached, as opposed to duty-cycle control, where the switch is turned off when a programmed time has elapsed. With the slope compensation instabilities in control of the switching signal for the switching device can be avoided. However, the slope compensation is only optimal for a certain situation, i.e. a certain combination of an input voltage and an output voltage, only. Hence, in applications, as mentioned above, where energy is provided to mobile electronic equipment by means of a battery the slope compensation is not optimal over the whole range of the input voltage.

Further, the transition from PWM to PFM mode is not trivial. For instance, in many cases, a burst mode is entered, with high ripple and low efficiency as a result. Therefore, many today converters have only a fixed-frequency controller and thus, are not able to change to a variable frequency PFM mode, at all. Instead, in case the load current drawn from the output terminals of such a converter is actually small, the converter is completely stopped until the output voltage has dropped to a low threshold value and then starts working for some time, until a high threshold is reached. Thus, in situations where a load only needs a small current, such converters perform a continuous alternation between switching on and switching off of the whole circuit.

Furthermore, even when there is a PFM mode, parameters as a length and a shape of the PFM pulses are chosen when the system enters the PFM state, e.g. by taking the parameters from the last duty-cycle in PWM mode. Those parameters are not changed once the system is in PFM mode. Since the PFM pulses have a fixed length once PFM mode is entered there is no adjustment in case of chances in the input voltage or the needed load current. Hence, in most cases the converter will more often have transitions from PFM mode to the PWM mode as actually necessary.

It is therefore an object of the present invention to provide an improved converter circuit. The invention is defined by the independent claims. The dependent claims define advantageous embodiments.

In one embodiment, the present invention provides a converter circuit, which is able to adjust parameters of the shape of a controlling signal for a performed switching operation mode with respect to actual values of an input and an output voltage, in particular to a current to a load, which is driven by said output voltage. In another embodiment, the present invention provides a converter circuit achieving slope compensation, which is adequate for different combinations of an input and an output voltage or different inductance values. In another embodiment, the converter circuit adjusts the applied slope compensation during operation such that it is substantial optimal for any ratio of an input and an output voltage and/or values of external components of the converter circuit alike an inductance or filter capacitance. In another embodiment, the present invention provides a more efficient transition of a converter circuit having a PFM and a PWM switching operation mode from PFM mode to PWM mode and vice versa with respect to actual values of an input and an output voltage, in particular to a current to a load that is driven by said output voltage According to a first aspect of the present invention, a converter circuit for converting an input voltage to an output voltage of a predetermined value is based on a switching operation. Said switching operation has switching operation cycles, wherein such a switching operation cycle comprises at least one switching operation phase. Said switching operation is controlled by a switching control means. The converter circuit further comprises a look-up table means in which a plurality of data is stored. Said switching control means uses certain data from said plurality of data with respect to an actual switched operating mode in which said converter circuit is operated for continuous adjusting a begin and an end of said at least one switching operation phase with respect to said input voltage and said output voltage. Said switched operating mode is at least a first switched operating mode, e.g. a PWM mode, or a second switched operating mode, e.g. PFM mode.

Advantageously, the converter circuit of the present invention can be realized as a full digitally circuit. Thus, there is no analog control circuitry needed. Preferably, the converter of the invention is a current mode controller. Up to now, all current mode controllers were analog. The only digital controllers available were duty-cycle controllers, which are only able to control on-time of a switching control signal beforehand with respect to an actual value of the output voltage. The converter according to the invention is able to adjust a parameter of said switching operation "on-the-fly", thus whole conversion operation is more efficient.

According to a second aspect of the invention, which can be combined, with said first aspect of the invention, the converter circuit further comprises voltage monitoring means for monitoring an actual value of said output voltage. Said voltage monitoring means generates an actual error signal according to an actual value of said output voltage with respect to at least one predetermined voltage level. Said at least one predetermined voltage level defines a signal window together with said predetermined output voltage.

Experiments have shown that for a sufficient regulation of the output voltage, with the fully digital controlled converter according to the invention, at least the information whether said output voltage lies within a predetermined signal window over or below said desired output voltage was enough to adjust said switched operation of said converter circuit by said switching control means.

According to a third aspect of the invention which can be combined with at least one of said first and second aspect of the invention, said converter circuit in operation is connected to at least one energy storing means for storing electrical energy and further comprises a current monitoring means for monitoring an actual electrical current through said energy storing means, said current monitoring means generating an actual current signal. Advantageously, the converter circuit of the invention requires no external control components, as the whole controller is digital. The only external components are the inductor and output filtering capacitor. More preferably, there is also applied an input filtering capacitor. Preferably, low equivalent series resistance (ESR) capacitors are used as filtering capacitor.

According to a fourth aspect of the invention which can be combined with at least one of said first to said third aspect of the invention, a first switched operating mode has a fixed cycle length, i.e. a PWM mode. Further, said certain data define at least one predetermined parabolic waveform. Said switching control means generates said parabolic waveform by a digital-analog converting means, e.g. a digital to analog converter. For that purpose, said switching control means input said certain data to said digital-analog converting means. Further, said generated parabolic waveform may be proportional to said input voltage if said input voltage is higher than said output voltage and proportional to said output voltage if said input voltage is lower than said output voltage. For this reason, said switching control means may be arranged to carry out a digital operation in which said certain data defining said parabolic waveform are weighted by said respective input or output voltage. It is also possible that this said digital-analog converting means is arranged to carry out such weighting operation.

According to a fifth aspect of the invention which can be combined at least with one of said first to said fourth aspect of the invention, said switching control means further regulates an current set point with respect to said error signal and said parabolic waveform. Further, said switching control means terminates said at least one switching operation phase when said actual current signal reaches said current set point.

Advantageously, slope compensation in the converter circuit of the present invention is made adaptive. By choosing said parabolic waveform, the slope compensation is optimal for all combinations of input and output voltages. More advantageously, for generation of said parabolic waveform no external components are needed: only said look-up table means according to the invention and a digital-analog converter (DAC) are sufficient. According to a sixth aspect of the invention, which can be combined at least, with one of said first to fifth aspect of the invention of the invention, a second switched operating mode has a variable cycle length, i.e. a PFM mode. Further, said certain data stored in said look-up table means comprise a plurality of on-time values for said at least one switching operation phase, said on-time values being indexed by a table index.

According to a seventh aspect of the invention which can be combined with said sixth aspect of the invention, said table index is derived by said switching control means from a ratio of said input voltage to said output voltage.

According to a eighth aspect of the invention which can be combined with at least one said sixth to said seventh aspect of the invention, said switching control means adjusts said table index in correspondence with an actual cycle on-time of said switching cycles and a predetermined time value.

Advantageously, the converter circuit of the present invention provides also in PFM mode adaptive switching control signal, e.g. adaptive PFM pulses, for controlling said switching operation. Thus, also in PFM mode with changes in input voltage, the shape of the switching control signal is adjusted. Hence, a transition from PFM mode to PWM mode is avoided where not necessary with respect to actual current needs of a load connected to said output voltage.

According to a ninth aspect of the invention which can be combined with at least one of said first to eighth aspect of the invention, said switching control means is adapted to change said switched operating mode from said first switched operating mode to said second switched operating mode when said current monitoring means detects a negative current and said output voltage is higher than a predetermined voltage value.

According to a tenth aspect of the invention which can be combined with at least one of said first to ninth aspect of the invention, said switching control means is adapted to change said switched operating mode from said second switched operating mode to said first switched operating mode when said output voltage is lower than a predetermined voltage value.

Advantageously, the converter circuit of the invention provides easy transition from PWM to PFM mode. For high currents, the converter works at a constant frequency. For low loads, it switches to a variable frequency system with minimum ripple. Moreover, it has been shown by experiments that in the converter circuit of the invention there is no burst mode.

According to any of the afore-mentioned aspects of the invention, said switching control means of said converter circuit is preferably realized by means of a digital circuitry, more preferably by a integrated digital controller, which may be integrated together with said converter circuit. Furthermore, said converter circuit may be an automatic up/down converter, which provides a desired predetermined output voltage from a variable input voltage, which may be out of a certain range, e.g. a voltage of a battery, of which a battery output voltage varies from loaded to unloaded.

The present invention will now be described based on a preferred embodiment with reference to the accompanying drawing in which.

The preferred embodiment will now be described on the basis of a converter circuit, which may be used in an integrated circuit for providing power supply of an electronic device, such as a mobile phone, for example.

Figure 1:
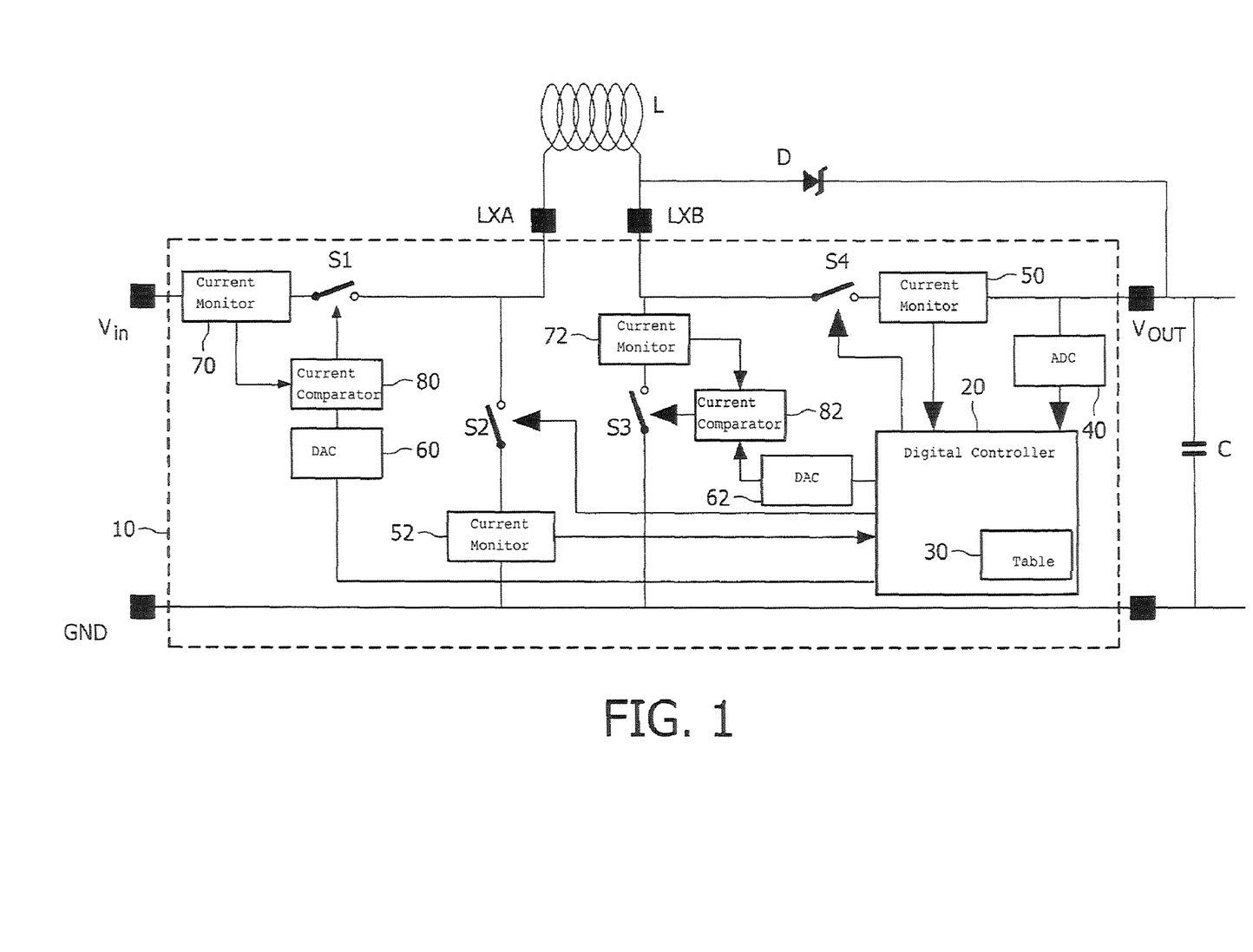
FIG. 1 shows a schematic block diagram of converter circuit according to the preferred embodiment.

In FIG. 1, the block diagram of a digital controlled converter circuit 10 of the present invention is shown. The converter circuit 10 provides an up mode, in which an input voltage is lower than the desired output voltage, and a down mode, in which an input voltage is higher then the desired output voltage. Advantageously, the inventive converter circuit is an automatic up/down converter. It should be noted that the shown converter circuit 10 is for better understanding reduced to its basic principle. Nevertheless, for the person skilled in the art it will be clear, how such converter circuit will be realized, i.e. reduced to practice.

The converter circuit 10 comprises as switching control means a digital controller 20. The digital controller 20 senses the actual value of the output voltage at a terminal Vout by current monitoring means, being an analog-to-digital converter (ADC) 40. It has been found that in a practical realization, the resolution of the ADC 40 may be limited. It has been shown that four voltage levels, preferably arranged symmetrically around a desired output voltage, are enough for realization of the auto up/down converter. Therefore, these four voltage levels define two signal windows, which are a small and a large signal window. In a preferred embodiment of the invention the small windows was arranged in symmetrical distance to the desired output voltage with 5 mV. For the large signal window, symmetrical levels of 20 mV have been adequate.

Further, the digital controller 20 is able to monitor electrical current in the different current paths of the converter circuit by means of current monitoring means 50, 52, 70 and 72, which, for instance, can be realized by a current sensing semiconductor device, e.g. a field effect transistor (FET) connected in parallel towards the respective switching element S1, S2, S3 and S4, i.e. a voltage of the FET is proportional to the respective current through the respective switching element. Another possibility instead of a current sensing device the voltage across the switching device itself can be used as information about the value of the current. Further, the digital controller 20 is able to control each switching element S1, S2, S3 and S4. Thus, the converter circuit 10 can be controlled by the digital controller 20 to perform a switched operation by which electrical energy is transferred from the input voltage at the terminal Vin via the inductor L, which is connected externally via terminals LXA, LXB to the converter circuit 10, as an energy storing means, to the output terminal Vout.

Any semiconductor switching element, e.g. a MOS transistor, may realize the four switching elements S1, S2, S3 and S4. Basically, with these switching elements S1, S2, S3 and S4 there are three useful current paths for a current through inductor L during a conversion operation of the converter circuit 10. A first current path goes from terminal Vin over switching element S1 via inductor L over switching element S3 to ground GND. The first path is used in the so-called up phase of the switching operation. A second current path goes from terminal Vin over switching element S1 via inductor L over switching element S4 to terminal Vout. The second current path is used in the so-called forward phase of the switching operation. A third current path goes from ground GND over switching element S2 via inductor L over switching element S4 to terminal Vout. The third current path is used in the so-called down phase of the switching operation.

Firstly, with respect to FIG. 1, in the following the operation of the converter circuit 10 in a pulse width operation mode (PWM mode) is described. Since the converter circuit 10 is a current mode controller, a current setpoint has to be defined which is used to determine a switching threshold for the switching elements S1 and S3. For determining the actual current setpoint, respective digital setpoint values are transformed through a digital-analog converting means 60, 62, e.g. a digital-analog converter (DAC), to an analog voltage, which is used as input signal for a respective peak current comparator. Two peak current comparators are present: a first peak current comparator 80 is used in down mode and a second peak current comparator 82 is used in up mode. Further, two zero current comparators are also present, which are included for better overview into the current monitoring means 50, 52. Thus a third current comparator is included in current monitoring means 52 and is used in down mode. Further, a fourth current comparator is included in current monitoring means 50 and is used in up mode.

It is to be noted that in a further development of the preferred embodiment, only one zero current comparator is used, which is current monitoring means 50. Thus, the herein described preferred embodiment can be modified such that always when current monitoring means 52 are addressed current monitoring means 50 are used instead of current monitoring means 52. Advantageously, current monitoring means 52 may be omitted. Generally, the zero current information is used to go from PWM mode to PFM mode. As already mentioned, this converter circuit 10 has three operating modes, which are the up mode (Vin<Vout), an automatic mode or short an auto mode (Vin≈Vout), and the down mode (Vin>Vout).

First, the up mode is described. The up mode has two switching operation phases. In the up phase, energy is stored in the inductor L. The up phase starts at the start of a PWM operation cycle, or operation period, and ends when a predetermined, e.g. programmed in the digital controller 20, peak current is reached. For this purpose, the actual peak current through the switching element S3, which can be a NMOS transistor, is measured by current monitoring means 72. The following switching operation is a forward phase. The forward phase starts after the up phase and ends at the end of a switching operation cycle or when a zero current is detected through the switching element S4, which can be a PMOS transistor, by the current measuring means 50.

The second mode for the converter circuit 10 is the automatic or auto mode. This mode has three possible switching operation phases. First, again, an up phase, which stores energy in the inductor L until a programmed peak current is reached. For this purpose, the actual peak current through the switching element S3 is measured by the current monitoring means 72. The following switching operation phase is a forward phase, in which energy is transferred to the output. This phase ends when a programmed peak current through switching element S1, which can be a PMOS transistor, is detected or when the end of the PWM switching operation cycle is reached or when zero current is detected through the switching element S4. The next switching operation phase is a down phase, where energy from the inductor L is released into the output. This phase ends at the end of a PWM switching operation cycle or when zero current is detected through the switching element S2 by the current monitoring means 52. Again it is noted that according to a further development of the preferred embodiment, in which there is only the current monitoring means 50 for detection of zero current, this phase ends at the end of a PWM switching operation cycle or when zero current is detected through the switching element S4 by the current monitoring means 50.

The last mode is the down mode. It has again two phases. First phase is a forward phase. Since the input voltage is higher than the output voltage, the inductor current increases. This phase ends when a peak current through switching element S1 is detected by current monitoring means 70 or when zero current is detected through switching element S4 by current monitoring means 50. The following phase is a down phase. This down phase ends at the end of a PWM switching operation cycle or when zero current is detected through switching element S2. All phases in the various switching operating modes of the PWM mode can be graphically represented in a state diagram, which is shown in FIG. 2.

Figure 2:
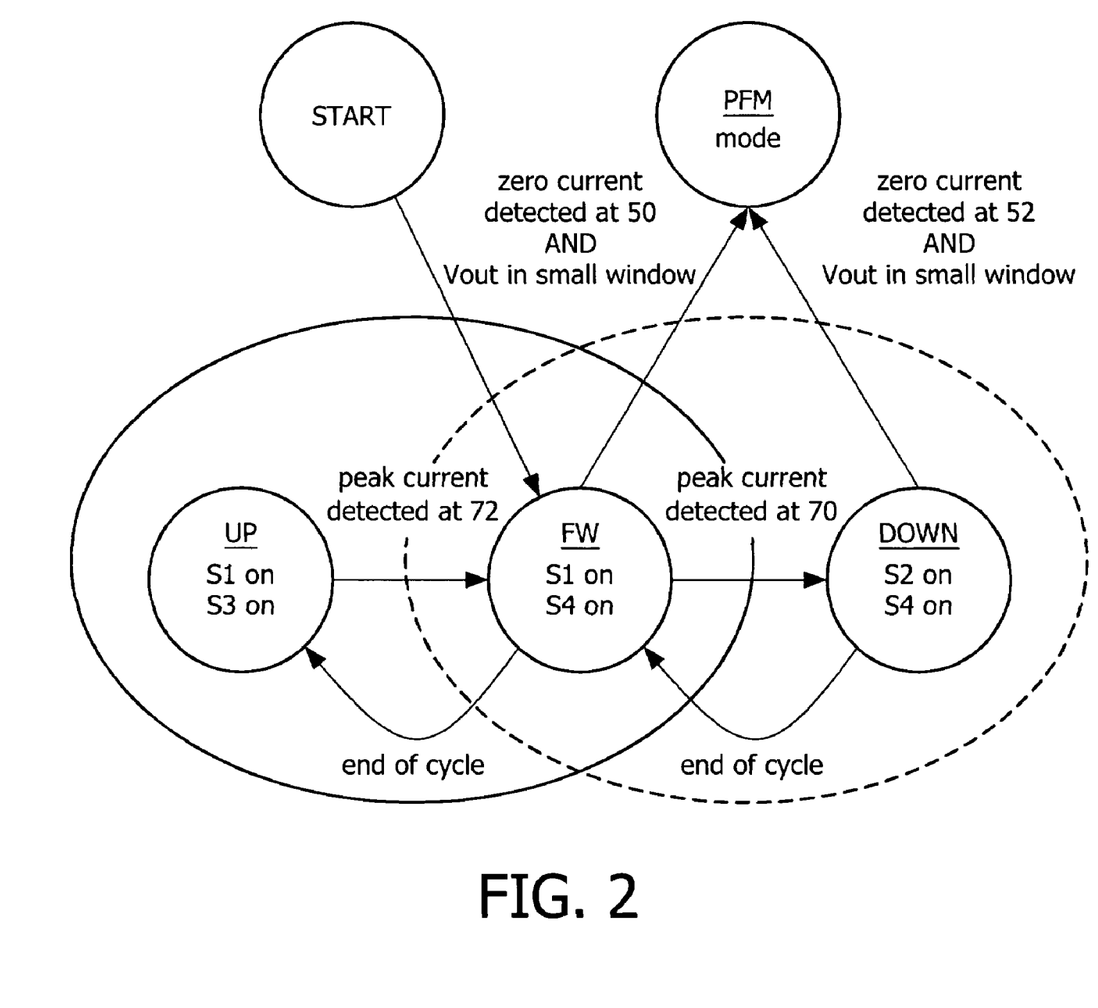
FIG. 2 shows a state diagram of the switching operation phases in PWM mode of the converter circuit according to the preferred embodiment.

As to the state diagram of the PWM mode in FIG. 2, since this diagram is together with the description of FIG. 1 self-explaining a detailed description is avoided for sake of brevity. Therefore, only some remarks should be noted. The state diagram shows the three states, which represent one of the possible switching operation phases (up, forward, down) of the converter circuit, and their conditions. In up mode, only the two left states are used. In down mode, only the right states are used. In auto mode, all states are used. It is to be noted that after a down phase no up phase will follow. The reason behind this is, in case the input voltage equals the output voltage, a stable situation can occur with equal up and down phases in each switching operation cycle, which results in generation of unnecessary switching transitions. In other words: The PWM switching operating mode can not have an up phase immediately after a down phase and a switching operation cycle can only start with an up phase, when the previous switching operation cycle has been finished with a forward phase. Advantageously, this results in prevention of repeating down and up phases following each other.

In the following with reference to FIG. 1, the PFM switching operation mode of the converter circuit 10 will be described. Basically, in PFM switching operation mode the DACs 60, 62 and first peak current comparator 80 and second peak current comparator 82 are not used, to save current. Further, of the four levels present in the ADC 40 according to the preferred embodiment of the invention, only one level is used. By this measure supply current of three further comparators is saved. In PFM mode, there are also the three different operating modes according to the relation between the input voltage and the output voltage. As already mentioned in connection with the PWM switching operating mode, there is an up mode (Vin<Vout), an auto mode (Vin≈Vout), and a down mode (Vin>Vout). As substantial difference to the modes of the PWM switching operating mode there is a further phase, which is a wait phase. In the wait phase, there is no current in the inductor. Only one of the switching elements S2 or S3 is closed for defining the potential of the inductor L.

Accordingly, in up mode, there are an up phase, a forward phase and a wait phase. In auto mode, there are an up phase, a forward phase, a down phase and a wait phase. In down mode, there are three phases again, a forward phase, a down phase and a wait phase. All phases in the various switching operating modes of the PFM mode can be graphically represented in a state diagram, which is shown in FIG. 3.

Figure 3:
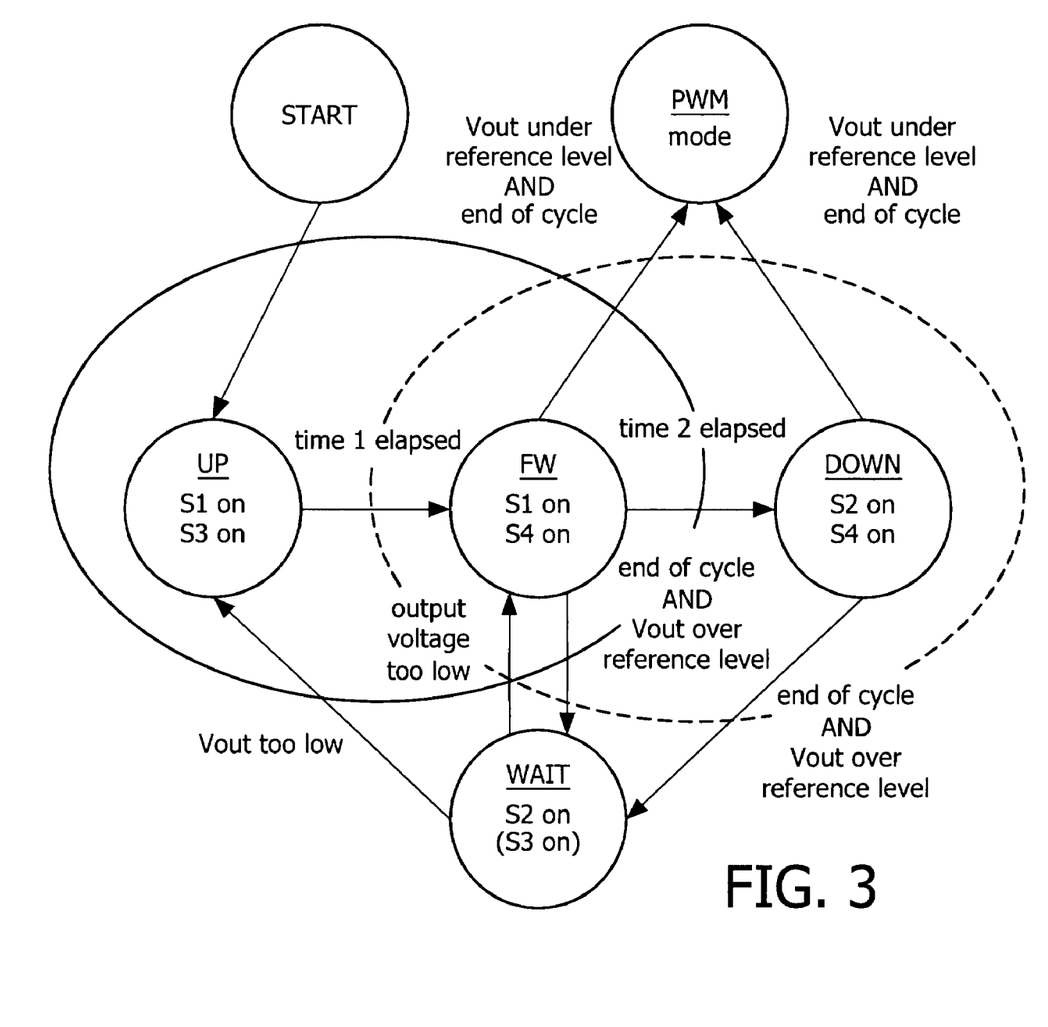
FIG. 3 shows a state diagram of the switching operation phases in PFM mode of the converter circuit according to the preferred embodiment.

As to the state diagram of the PWM mode in FIG. 3, since this diagram is together with the description of FIG. 1 self-explaining a detailed description is avoided for sake of brevity. Only some remarks should be noted. In the PFM mode state diagram of FIG. 3, time 1 and time 2 defining the duration of the respective phase are taken from a look-up table, which will be explained in more detail further below. This table index is adjusted during operation, depending on the actual pulse length of the PFM switching operation cycles. In the preferred embodiment of the inventive converter circuit 10, the target length is 16 clock periods of the digital controller 20, whereas the PWM switching operation cycle time is 8 clock periods of the digital controller 20. The maximum frequency in PFM mode is therefore half the PWM frequency.

Figure 4:
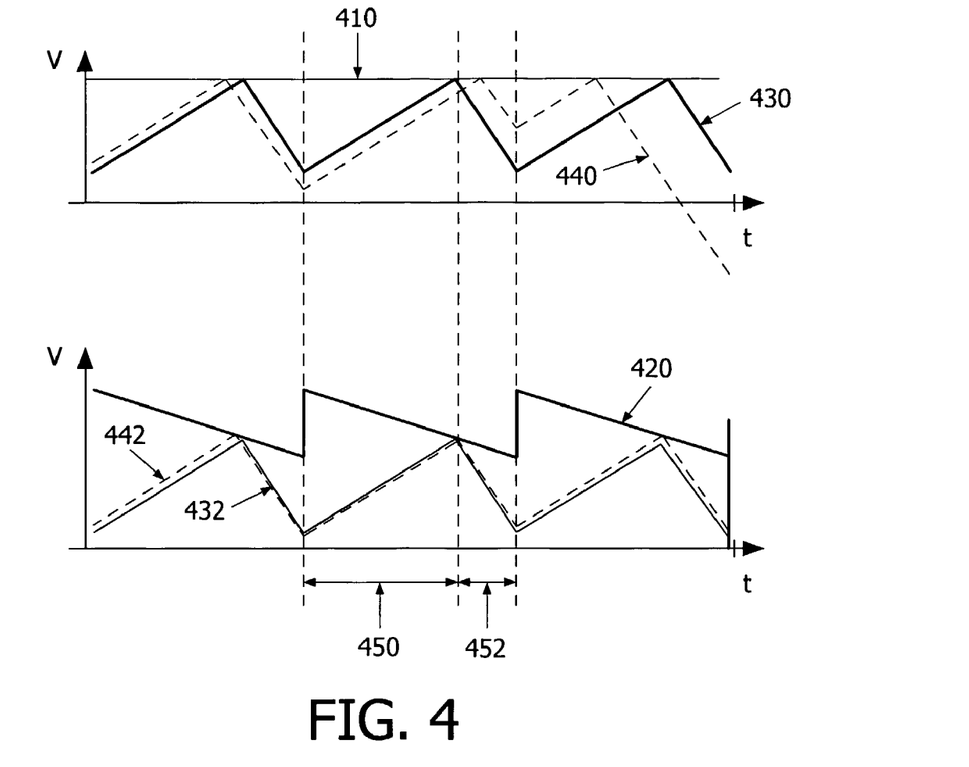
FIG. 4 depicts the known principle of slope compensation.

According to one aspect of the present invention, the converter circuit 10 operated in PWM switching operating mode applies current mode control and slope compensation for adjusting the switching control signals, by which the digital controller 20 controls the switching elements S1, S2, S3 and S4. As mentioned above, current mode control means that an active switching element is turned off when an actual current reaches a programmed peak current. As to duty-cycle control, here an active switch is turned off when a programmed time has elapsed. This is shown in FIG. 4 in the upper diagram, solid line 430. Here the waveform of a voltage, representing an actual peak current, e.g. at the input terminal of a comparator, is shown. The respective active switching element is switched of when a predetermined current setpoint 410 is reached by the actual peak current. However, for duty-cycles over 50%, instabilities can occur. This is depicted by dotted line 440 in the upper diagram of FIG. 4. This problem is well known in current mode controlled converters. It is usually dealt with by applying so called slope compensation. The mechanism of slope compensation is depicted in the lower diagram of FIG. 4. It is common practice to use the waveform of a sawtooth voltage 420 as current setpoint, which can usually derived from the sawtooth oscillator in known analog converters. Thus, by using the sawtooth waveform 420 both current signals 442 and 432 are stable. It should be noted that in the lower diagram of FIG. 4 a whole switching operation cycle is depicted by the length of the two arrows 450 and 452, wherein arrow 450 depicts the length of an up phase and arrow 452 depicts the length of an forward phase.

Surprisingly, the inventors have found out that a parabolic voltage, with the amplitude proportional to the input voltage for the down mode of the converter and proportional to the output voltage for the up mode of the converter, slope compensation is always optimal. As the converter circuit 10 of the present invention is build as a fully digital controller the optimal waveform is stored to a look-up table means 30 (e.g. a ROM) of the converter circuit 10 (see FIG. 1). Together with one of the DACs 60, 62 the digital controller 20 can generate the needed parabolic waveform voltage at an input terminal of the first peak current comparator 80 and second peak current comparator 82. Advantageously, constant slope compensation is possible, which is independent of the duty-cycle of the switching control signal. Moreover, with the proper choice of the waveform, a dead-beat behavior can be obtained, that is very difficult to realize with an analog controller. Furthermore, with a parabolic shape, the slope compensation is independent of the duty cycle.

Figure 5:
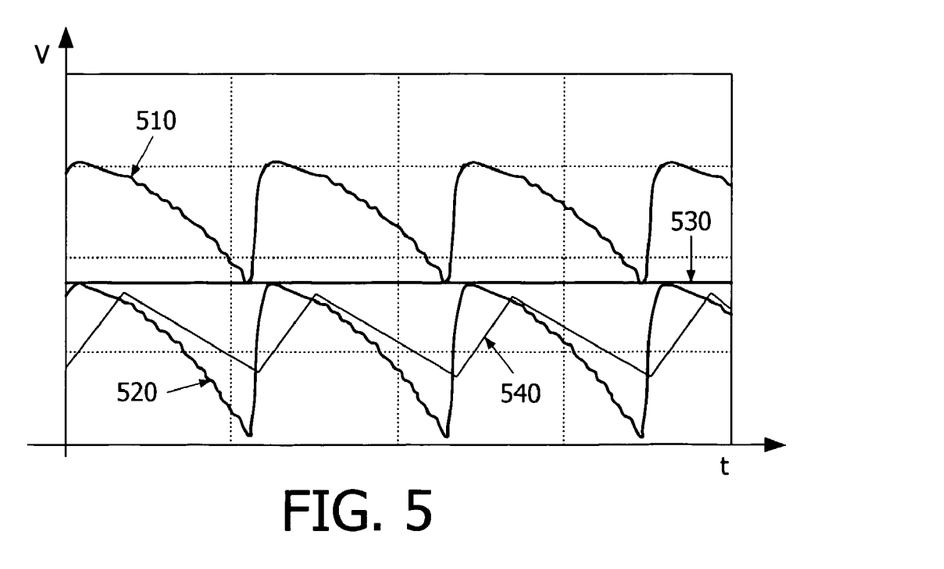
FIG. 5 shows the adaptive slope compensations according to the preferred embodiment.

For up mode only or down mode only, the parabolic waveform is subtracted from the actual setpoint 530, which is depicted in FIG. 5 by the waveform 520. For the auto converter, the down phase parabolic waveform is added to the setpoint 530, which is depicted in FIG. 5 by waveform 510. According to the preferred embodiment of the invention, there are used two parabolic waveforms 510, 520. One is used for up mode and one is used for down mode. In FIG. 5, the parabolic waveform 510 is proportional to the input voltage. Waveform 510 is used in the forward phase at the first peak current comparator 80 for the down and auto modes. The parabolic waveform 520 is proportional to the output voltage. Waveform 520 is used in the up phase at the second peak current comparator 82 for the up and auto modes. In a practical realization of the inventive converter circuit according to the preferred embodiment, the setpoint range is from 0 to 63 for a 6-bit DAC. Since the waveform 510 is higher than the setpoint 530, the setpoint range is extended to −15 to be able to reach a zero current. FIG. 5 shows an example of a waveform 540 of a voltage representing the switch inductor current.

Since the present invention is a digital system, the resolution of the peak current setpoint is limited. In one realization of the invention, the resolution is 20 mA per DAC LSB. The desired resolution may be much higher. This may be achieved by averaging the setpoint between two values over a number of switching operation cycles. This is called "fractional behavior" or the "fraction". In one realization of the inventive converter circuit, the fraction is 64 periods. Typical for the converter circuit of the present invention are the two voltage windows used for generating the voltage error signal. Preferably, a small-signal window is +5 mV and −5 mV away from the reference, i.e. the desired output voltage. If the output voltage exceeds these levels, a small-signal response starts for maximum accuracy. Preferably, a large-signal window may be +20 mV and −20 mV away from the reference. Exceeding these levels triggers the large-signal response for maximum speed. A comparator detects each level. For better understanding, names of the comparators and corresponding levels are shown in the next table.

| Level | Comparator |
| --- | --- |
| +20 mV | Hi20m |
| +5 mV | Hi5m |
| −5 mV | Lo5m |
| −20 mV | Lo20m |

In the following a possible current setpoint control loop for the converter circuit of the present invention is described. The control loop of an embodiment of the invention incorporates 7 states.

| Comparator State | P | I | Name | Comment |
| --- | --- | --- | --- | --- |
| Lo20m | 6 | I + 1 | Ramp-up fast | Max I = 63 |
| Lo5m | 2 | I + 16/64 | Ramp-up slow | |
| Lo5m | 2 | I + 1/64 | Increase Fraction | |
| — | 0 | I | In window | |
| Hi5m | −2 | I − 1/64 | Decrease Fraction | |
| Hi5m | −2 | I − 16/64 | Ramp-down slow | |
| Hi20m | −6 | I − 1 | Ramp-down fast | Min I = −15 |

Figure 6:
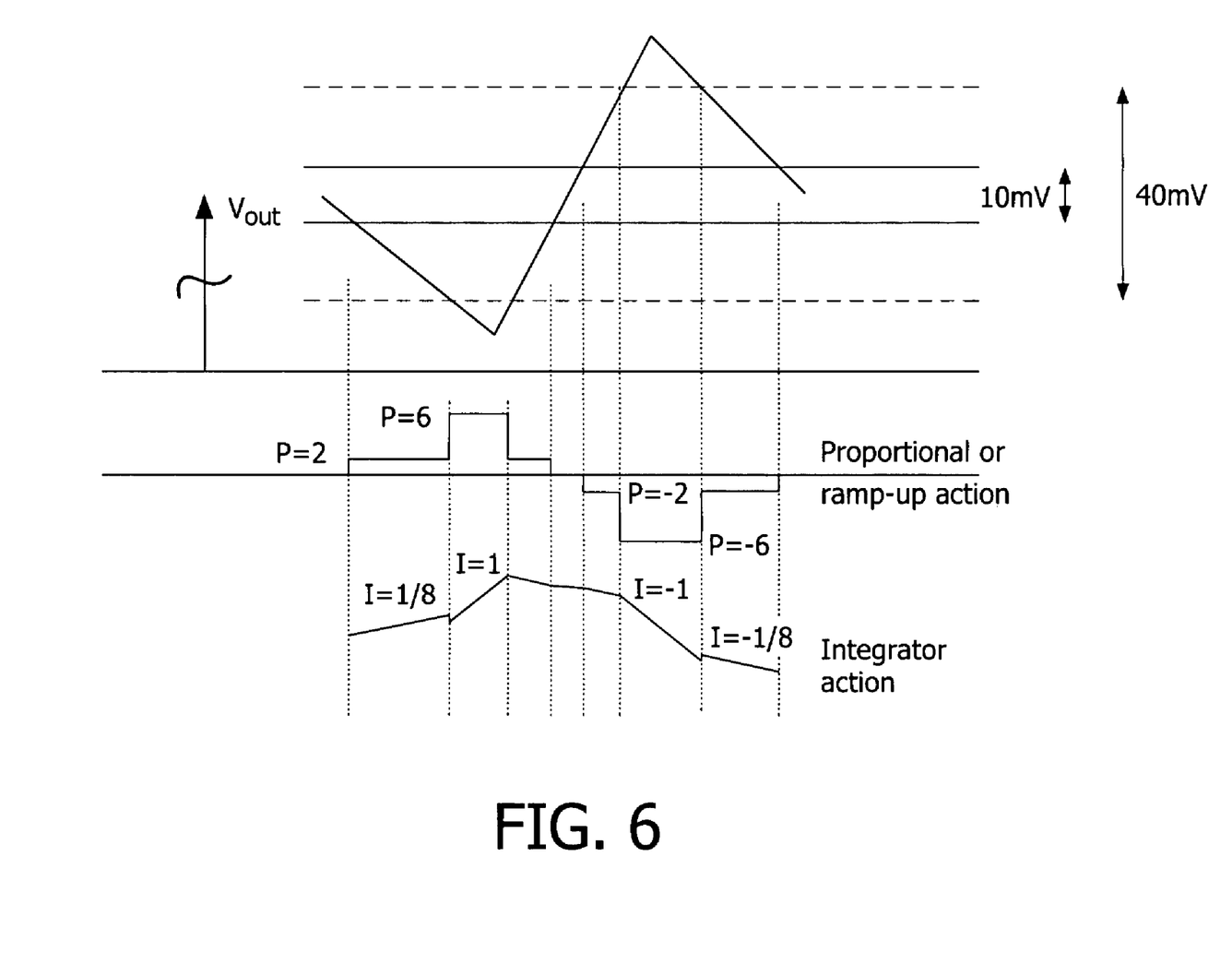
FIG. 6 shows the regulation parameters of the current set point with respect to output voltage.

In the table above, P is the proportional part and I is the integrating part of the control loop for the current setpoint. Experiments have shown that one exception is advantageous: if after one switching operation cycle the programmed peak current is not reached and the output voltage is still too low, the integrator is not updated. The purpose of the P factor is to stabilize the system, whilst the I factor ensures that there is no static error in the output voltage. The states lo5m and hi5m are split in two: at first, only the fraction is adapted, if the output voltage is outside the small-signal window. In the next period, if the conditions have not changed, the small-signal response is initiated. The extra states were added to increase the static resolution of the circuit. FIG. 6 shows an example for the relation between P, I and the output voltage.

Figure 7:
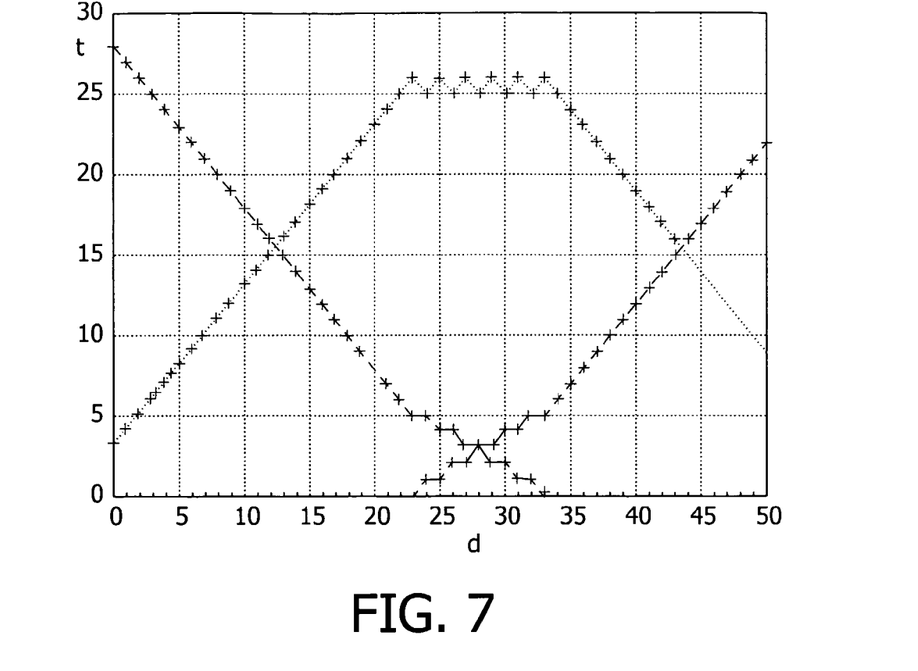
FIG. 7 shows an example for a graphical representation of data stored to the look-up table according to the preferred embodiment.
Figure 8:
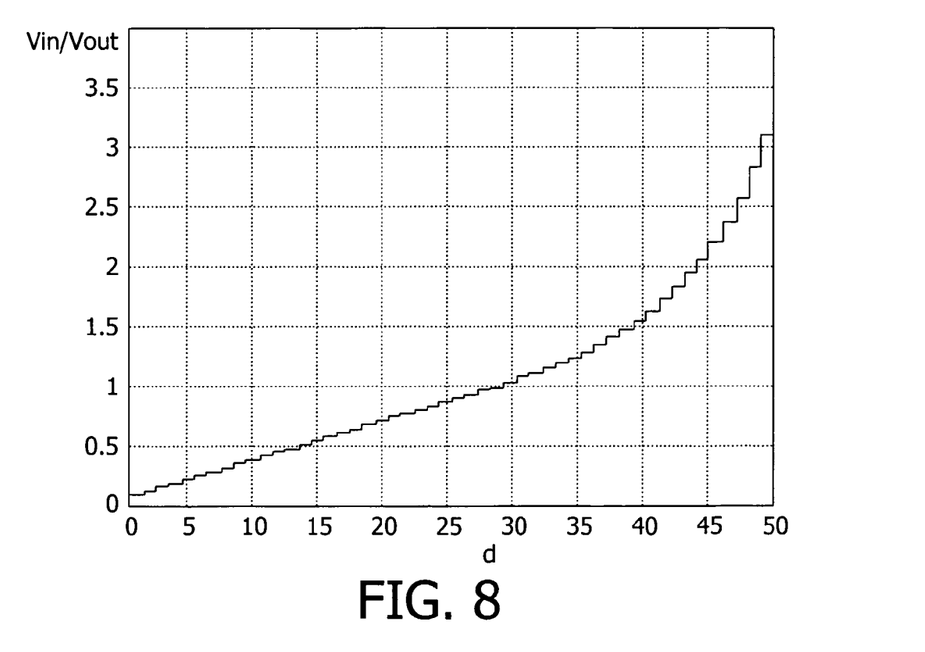
FIG. 8 shows an example for a graphical representation of data stored to the look-up table for determining a table index according to the preferred embodiment.

According to another aspect of the present invention, in PFM switching operation mode the on-time of a switching operation cycle is adjusted. In PFM switching operation mode, there is no need for a current control, as the system becomes first order here. Advantageously, disabling the DACs 60, 62 and the peak current monitoring means saves a lot of energy and makes the converter more efficient. In PFM switching operation mode, the on-time is taken from the indexed look-up table 30 (see FIG. 1). A graphical representation of the data stored to the look-up table 30 is shown in FIG. 7. In the center area, the up phases and down phases change alternately. This makes the gain in this area equal to the gains in the up only or down only modes. The digital controller 20 is adapted to measure the length of a PFM pulse. If it is longer than twice the PWM switching operation cycle time then more current is needed and the index d is increased. Advantageously, the length of the PFM pulse is thus continuously adapted to changes in the input voltage, e.g. the decreasing voltage of a battery pack. FIG. 8 shows the transfer ratio Vout/Vin as a function of the table index d.

According to another aspect of the invention, the unnecessary transitions of the converter between PFM switching operation mode and PWM switching operating mode should be avoided. Therefore, the converter circuit 10 according to the invention goes from PWM switching operating mode to PFM switching operation mode when negative currents are detected and when the output voltage is within the small error signal window. In PFM switching operation mode, only the lo5m reference level is used. When the output voltage becomes lower, a switching operation cycle is generated and the voltage should be higher than the reference. If the voltage is still too low, the system goes to PWM switching operating mode.

This type of converter can be applied in most or all portable electronic equipment, for instance, mobile phones, Personal Digital Assistants (PDA), portable cd/mp3 players, GPS systems and so on. It is however not limited to these applications. The same principles can be applied for mains fed or automotive DC-DC converters. In most of these cases, it is attractive to use small ceramic capacitors and to have no external components, which can be done with the converter circuit according to the present invention.

In summery, the present invention provides a fully digital DC/DC automatic up/down converter circuit for converting an input voltage to an output voltage of a predetermined value based on a switching operation. The switching operation comprises switching operation cycles, which comprise at least one switching operation phase. The converter is controlled by digital controller, which comprises a look-up table in which a plurality of data is stored. The digital control means uses certain data from said plurality of data with respect to an actual switched operating mode for continuous adjusting begin and end of a switching operation. The switched operating modes are a PWM and a PFM mode. The converter is optimal for portable electronic equipment, which come with a battery pack for power supply. Advantageously, the converter of the invention provides a stable output voltage over the whole range of the input voltage supplied by such battery pack. Further, in most of these cases small ceramic capacitors can be used and there no further need for external components.

It is noted that the term "comprising" when used in the specification including the claims is intended to specify the presence of stated features, means, steps or components, but does not exclude the presence or addition of one or more other features, means, steps, components or groups thereof. Furthermore, the word "a" or "an" preceding an element in a claim does not exclude the presence of a plurality of such elements. Moreover, any reference sign do not limit the scope of the claims. The invention can be implemented by means of both hardware and software, and several "means" may be represented by the same item or hardware.

The invention claimed is:

1. A DC-DC converter circuit for converting an input voltage to an output voltage of a predetermined value based on a switching operation, said switching operation having switching operation cycles, wherein a switching operation cycle comprises at least one switching operation phase, controlled by a digital controller, said converter circuit further comprises a look-up table means in which a plurality of data is stored, wherein said digital controller uses certain data from said plurality of data with respect to an actual switched operating mode in which said converter circuit is operated for continuously adjusting a begin and an end of said at least one switching operation phase with respect to said input voltage and said output voltage, said switched operating mode being at least a first switched operating mode or a second switched operating mode, wherein the first switched operating mode is a pulse width modulation mode and the second switched operating mode is a pulse frequency modulation mode.

2. Converter circuit according to claim 1, wherein said converter circuit further comprises voltage monitoring means for monitoring an actual value of said output voltage, said voltage monitoring means generating an actual error signal according to an actual value of said output voltage with respect to at least one predetermined voltage level, which defines a signal window together with said predetermined output voltage.

3. Converter circuit according to claim 1, wherein said converter circuit in operation is connected to at least one energy storing means for storing electrical energy and further comprises a current monitoring means for monitoring an actual electrical current through said energy storing means, said current monitoring means generating an actual current signal.

4. Converter circuit according to claim 1, wherein a first switched operating mode has a fixed cycle length and said certain data define a predetermined parabolic waveform.

5. Converter circuit according to claim 4, wherein said switching control means generates said parabolic waveform by a digital-analog converting means, to which said certain data is input from said switching control means.

6. Converter circuit according to claim 5, wherein said generated parabolic waveform is proportional to said input voltage if said input voltage is higher than said output voltage and proportional to said output voltage if said input voltage is lower than said output voltage.

7. Converter circuit according to claim 4, wherein said switching control means further regulates an current set point with respect to said error signal and said parabolic waveform.

8. Converter circuit according to claim 7, wherein said switching control means terminates said at least one switching operation phase when said actual current signal reaches said current set point.

9. Converter circuit according to claim 1, wherein a second switched operating mode has a variable cycle length and said certain data stored in said look-up table means comprise a plurality of on-tine values for said at least one switching operation phase, said on-time values being indexed by a table index.

10. Converter circuit according to claim 9, wherein said table index is derived by said switching control means from a ratio of said input voltage to said output voltage.

11. Converter circuit according to claim 9, wherein said switching control means adjusts an actual table index in correspondence with an actual cycle on-time of said switching cycles and a predetermined time value.

12. Converter circuit according to claim 1, wherein said switching control means is adapted to change said switched operating mode from said first switched operating mode to said second switched operating mode when said current monitoring means detects a negative current and said output voltage is higher than a predetermined voltage value.

13. Converter circuit according to claim 1, wherein said switching control means is adapted to change said switched operating mode from said second switched operating mode to said first switched operating mode when said output voltage is lower than a predetermined voltage value.

14. Converter circuit according to claim 1, wherein said converter circuit is an automatic up/down converter.

15. A method performed by a DC-DC converter circuit for converting an input voltage into an output voltage of a predetermined value based on a switching operation, said switching operation having at least a first switched operating mode and a second switched operating mode, wherein the first switched operating mode is a pulse width modulation mode and the second switched operating mode is a pulse frequency modulation mode, said method comprising the steps of
  monitoring said output voltage and generating a error signal with respect to an deviation of said output voltage from an predetermined voltage value;
  performing a switching operation for providing electrical energy from said input voltage into an energy storing means;
  monitoring an electrical energy flow from said energy storing means to said output voltage;
  taking predetermined data stored to a look-up table of said converter circuit, said data determining an optimal length of a switching operation phase of said switching operation with respect to said energy flow and a ratio of said input voltage and said output voltage; and
  digitally controlling said switching operation phases by terminating each of said switching operation phases according to said predetermined data.

16. A DC-DC converter circuit for converting an input voltage to an output voltage of a redetermined value based on a switching operation, said switching operation having switching operation cycles, wherein a switching operation cycle comprises at least one switching operation phase, controlled by a digital controller, said converter circuit further comprising a look-up table means in which a plurality of data is stored, wherein said digital controller is a current mode controller, which uses certain data from said plurality of data with respect to an actual switched operating mode in which said converter circuit is operated for continuously adjusting a begin and an end of said at least one switching operation phase with respect to said input voltage and said output voltage, said switched operating mode being at least a first switched operating mode or a second switched operating mode, wherein the first switched operating mode is a pulse width modulation mode and the second switched operating mode is a pulse frequency modulation mode.

17. A method performed by a DC-DC converter circuit for converting an input voltage to an output voltage of a predetermined value based on a switching operation, said switching operation having at least a first switched operating mode and a second switched operating mode, wherein the first switched operating mode is a pulse width modulation mode and the second switched operating mode is a pulse frequency modulation mode;
said method comprising the steps of:
  monitoring said output voltage and generating an error signal with respect to a deviation of said output voltage from a predetermined voltage value;
  performing a switching operation for providing electrical energy from said input voltage into an energy storing means;
  monitoring an electrical energy flow from said energy storing means to said output voltage;
  taking predetermined data stored to a look-up table of said converter circuit, said data determining an optimal length of a switching operation phase of said switching operation with respect to said energy flow and a ratio of said input voltage and said output voltage; and
  digitally controlling, by means of current mode control, said switching operation phases by terminating each of said switching operation phases according to said predetermined data.

18. A DC-DC converter circuit for converting an input voltage to an output voltage of a predetermined value based on a switching operation, said switching operation having switching operation cycles, wherein a switching operation cycle comprises at least one switching operation phase, controlled by a digital controller, said converter circuit further comprising a look-up table means in which a plurality of data is stored, and a digital-analog converter (DAC), wherein said digital controller uses certain data from said plurality of data with respect to an actual switched operating mode in which said converter circuit is operated for continuously adjusting a begin and an end of said at least one switching operation phase with respect to said input voltage and said output voltage, said switched operating mode being at least a first switched operating mode or a second switched operating mode, wherein the first switched operating mode is a pulse width modulation mode and the second switched operating mode is a pulse frequency modulation mode, and wherein said digital controller generates a parabolic waveform by said digital-analog converter, to which said certain data is input from said digital controller.

* * * * *